(12) United States Patent
Chapman (10) Patent No.: US 10,321,002 B1
(45) Date of Patent: Jun. 11, 2019

(54) VARIABLE DATA VECTOR GRAPHIC PATTERN INK PANTOGRAPH

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/896,667

(22) Filed: Feb. 14, 2018

(51) Int. Cl.
*H04N 1/00* (2006.01)

(52) U.S. Cl.
CPC ................ *H04N 1/0087* (2013.01)

(58) Field of Classification Search
None
See application file for complete search history.

(56) References Cited

U.S. PATENT DOCUMENTS

| | | | |
|---|---|---|---|
| 7,869,090 B2 | 1/2011 | Wang et al. | |
| 8,233,197 B2 | 7/2012 | Wang et al. | |
| 8,355,180 B2 | 1/2013 | Wu et al. | |
| 8,593,698 B2 | 11/2013 | Simske et al. | |
| 8,817,330 B2 | 8/2014 | Cole et al. | |
| 8,891,136 B2 | 11/2014 | Simske et al. | |
| 8,909,775 B2 | 12/2014 | Tredoux et al. | |
| 9,092,858 B2 | 7/2015 | Simske et al. | |
| 9,864,906 B2 | 1/2018 | Eschbach et al. | |
| 9,864,920 B2 | 1/2018 | Eschbach et al. | |
| 2003/0156733 A1* | 8/2003 | Zeller | G06T 1/0078 382/100 |
| 2011/0310441 A1* | 12/2011 | Simske | B41M 3/14 358/3.28 |

OTHER PUBLICATIONS 6.6 MTF—Modulation Transfer Function, telescope-optics.net, http://www.telescope-optics.net/mtf.htm, printed Jan. 25, 2018, 10 pages.

* cited by examiner

*Primary Examiner* — Lennin R RodriguezGonzalez
(74) *Attorney, Agent, or Firm* — Loza & Loza LLP; Kermit D. Lopez; Luis M. Ortiz (57) ABSTRACT

Methods and systems for forming a pattern ink pantograph. In an example embodiment, two or more pattern inks can be configured, such that a frequency of one pattern ink among the two (or more) pattern inks comprises a frequency below an MTF (Modulation Transfer Function) and a frequency of another pattern ink among the two or more pattern inks comprises a frequency above said MTF. The two or more pattern inks can be used as a special color space to paint a font or a geometric object, and such pattern inks are also independent of what is being written. Each pattern ink comprises vector graphic data.

20 Claims, 7 Drawing Sheets

VARIABLE DATA VECTOR GRAPHIC PATTERN INK PANTOGRAPH

TECHNICAL FIELD

Embodiments are generally related to the field of security for document printing applications. Embodiments also relate to pantographs and void pantographs for authenticating and securing documents.

BACKGROUND

As the quality of color copiers has improved, it has become easier to generate copies of a document that are indistinguishable from the original document. In many instances, the unauthorized copying of document content can have serious implications. For example, there is a concern that color copiers could be used to reproduce security documents, such as checks, stock certificates, automobile title instruments, and other documents of value, for illegal purposes.

One approach for authenticating documents and reducing unauthorized copying involves the use of what is commonly referred to as a void pantograph. Conventional techniques for creating pantographs involve forming printed dots (or other elements) of two different sizes and frequencies, which are used to create regions of similar tone, corresponding to a textual warning and background, respectively, in an original (authentic) document. Tone refers to the visual appearance produced by halftone dots, bars, or marks which cover at least a portion of a printed area and which usually have a frequency that is measured in dots, lines, or marks per inch. To provide a constant tone, the smaller elements have a higher frequency than the larger elements. Because the tone of the textual warning and the tone of the background pattern are selected to be the substantially the same, these two regions have a similar visual impact on an observer of the original document, and the textual warning is not readily perceived.

Upon copying, however, the situation changes. Since the response of an image sensor employed in the scanner is different from the response of the human visual system, changes in the relative tone of the two different areas will appear. These changes are due to the different frequency response of the sensor (with respect to the human eye) and also due to other, normally non-linear, effects, such as a detection floor or threshold, where signals below a certain level are simply "lost." In general, the high frequency components are more strongly affected and attenuated. The difference in response of the scanner expresses itself as a relative change in tone in the copy and thus the hitherto invisible textual warning becomes visible. For example, in the resulting copy, only the larger printed dots are apparent. These larger dots spell out the word "void," or other pre-determined textual warning.

In current techniques, the pantograph is applied to the substrate to create a pre-printed carrier. An image to be protected is then applied to the pre-printed carrier. These methods have generally been successful in protecting documents, and are sometimes combined with other techniques, such as the use of camouflage patterns, and the like. However, they are static in nature and thus in general are limited to generally valid, partly nondescript words like "void" or "copy." Void pantographs are thus a well-known technique used for fraud protection.

Figure 1:
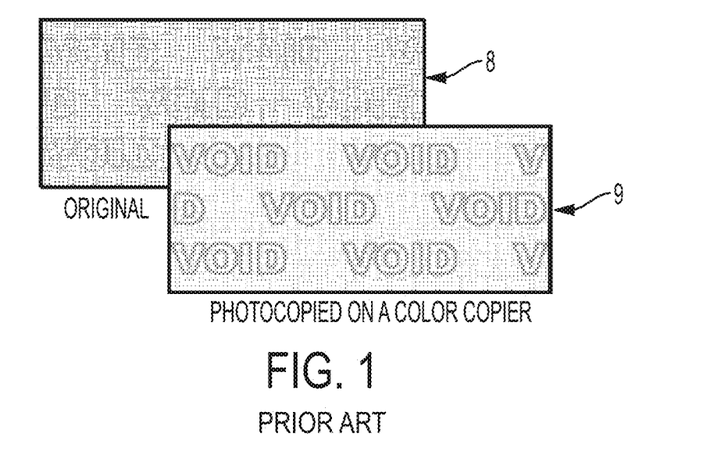
FIG. 1 illustrates a prior art pictorial diagram depicting a document with a void pantograph.

FIG. 1 illustrates a prior art pictorial diagram 10 depicting a document with a void pantograph. That is, an original document 8 is shown in FIG. 1 prior to photocopying of the document. A photocopied document 9 (i.e., after the original document 8 has been photocopied with a color copier) of the original document 8 is shown with the words "VOID" displayed. A voice pantograph includes a pantograph screen with the word "VOID" hidden in it, created by using special screens and background designs. When photocopied by a color printer, the word "VOID" appears on the copied document, such as the photocopied document 9. A document with a void pantograph is thus more difficult to duplicate than one with a standard pantograph.

Figure 2:
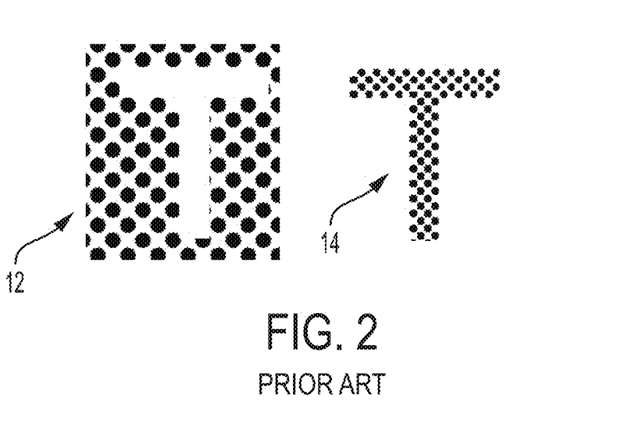
FIGS. 2-3 illustrates a prior art pantograph technique.
Figure 3:
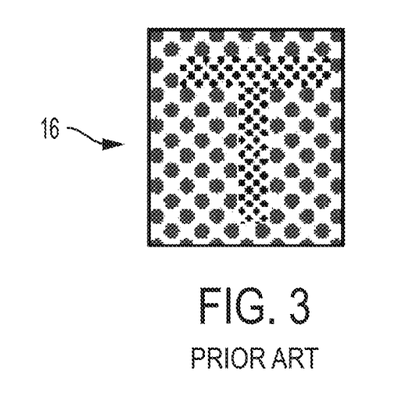

FIGS. 2-3 illustrate a prior art pantograph technique. In FIG. 2, a technique is shown involving a variable data pantograph using font pairs and Type 3 fonts with bitmap images. In the example shown in FIG. 2, the character "T" is shown with respect to two fonts 12 and 14 (e.g., respectively, font 1 left and font 2 right). A pantograph "T" is composed of the front pair written in the same space as shown in the arrangement 16 in FIG. 3. The goal is for the original "T" to appear as one level in the original, but be readable on the copy. The smaller and bigger dots are used in a conventional pantograph technique.

Another conventional example of a void pantograph technique is disclosed in U.S. Pat. No. 7,869,090, which shows a variable data pantograph using font pairs. The advantage of this approach over a single font is that fewer total fonts are needed for calibration. Due to the binary representation of this approach, a new font pair is needed for each font size style and face. Thus, for example, for a single font, e.g., Xerox-Sans with 10 sizes (e.g., 18-72 points every 6 points), 4 styles (e.g., Roman, Italic, Bold, and Bold-Italic), one would need, for example, 10×4×2 pair×5 minimum calibration set=400 separate fonts. The minimum calibration is required due to typical printer variation (e.g., drift) where the dots vary from printer to printer and the same printer over time. This approach and the conventional techniques shown in FIGS. 2-3 are generally too cumbersome and impractical to implement in actual products.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved methods and systems for authenticating documents.

It is another aspect of the disclosed embodiments to provide for improved void pantographs used for authenticating documents.

If is a further aspect of the disclosed embodiments to provide for a variable data vector graphic pattern ink pantograph.

The aforementioned aspects and other objectives and advantages can now be achieved as described herein. Methods and systems for forming a pattern ink pantograph are disclosed. In an example embodiment, at least two pattern inks can be configured, such that a frequency of one pattern ink among the two (or more) pattern inks comprises a frequency below an MTF (Modulation Transfer Function) and a frequency of another pattern ink among the two or more pattern inks comprises a frequency above the MTF. The two or more pattern inks are usable as a special color space to paint a font or a geometric object, and such pattern inks are also independent of what is being written. Each pattern ink comprises vector graphic data.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully herein after with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems/devices. Accordingly, embodiments may, for example, take the form of hardware, software, firmware or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms, such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Additionally, the term "step" can be utilized interchangeably with "instruction" or "operation".

Unless defined otherwise, all technical and scientific terms used herein have the same meanings as commonly understood by one of ordinary skill in the art. As used in this document, the term "comprising" means "including, but not limited to."

A "computing device" or "electronic device" or "data processing system" refers to a device or system that includes a processor and non-transitory, computer-readable memory. The memory may contain programming instructions that, when executed by the processor, cause the computing device to perform one or more operations according to the programming instructions. As used in this description, a "computing device" or "electronic device" may be a single device or any number of devices having one or more processors that communicate with each other and share data and/or instructions. Examples of computing devices or electronic devices include, without limitation, personal computers, servers, mainframes, gaming systems, televisions, and portable electronic devices such as smartphones, personal digital assistants, cameras, tablet computers, laptop computers, media players, and the like. Various elements of an example of a computing device or processor are described below in reference to FIG. 6.

In this disclosure, the term "document processing system" refers to a system that includes one or more processors that are in electronic communication with a non-transitory, computer-readable memory containing programming instructions that, when executed, cause one or more of the processors to implement commands to perform document processing functions such as those described above and below.

In this document, the terms "communication" and "electronic communication" refer to the ability to transmit data via one or more signals between two or more electronic devices, whether through a wired or wireless network, and whether directly or indirectly via one or more intermediary devices.

"Multi-functional device" or "MFD" refers to a machine comprising hardware and associated software configured for printing, as well as at least one other function such as copying, facsimile transmitting or receiving, scanning, or performing other actions on document-based data. In this document, the term "print device" refers to a device that performs printing based on digital data, or a multi-functional device in which one of the functions is printing based on digital data. Examples include printers, copiers, plotters, and multi-function devices.

"Security element" refers to a mark printed on or otherwise applied to the substrate that verifies the authenticity of a document uniquely enabling a reader of the document to identify the document as originating from an authorized source. A security element may be an anti-counterfeiting mark that may include, for example, a micro text mark, a microgloss mark, a correlation mark, GlossMark® text, a fluorescent mark, raised seals, watermarks, an infrared mark, and/or the like. In general, the security elements have features that cannot be photocopied or scanned by ordinary copying devices without altering the appearance of the security element. For example, data encoded as microtext may be so small that it is not within the resolution of ordinary copying devices, or if it is within the resolution of an ordinary copy device it may be so faint that it could not be copied without also substantially altering the appearance of the background or other information printed on the document.

A "secured document" refers to a document that contains at least one security element that verifies the authenticity of the document.

A "validation document" is a dynamic document created by the document processing system that may be used to convey information, to a user, regarding the authenticity of a secured document. A validation document may be outputted to the user in the form of an electronic document and/or hardcopy printable format.

In this document, "authenticating" or "validating" a document refers to determining whether the document is an authentic copy of the original document, i.e., whether the document has been altered while it was in the hard copy form. Alteration may occur due to deliberate effort or accidental events.

Figure 4:
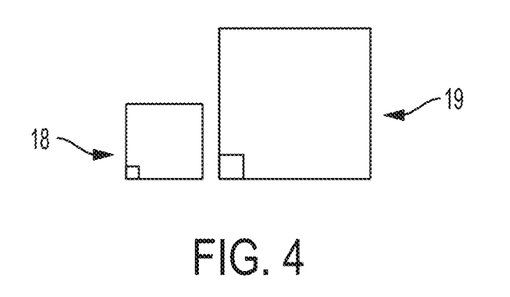
FIG. 4 illustrates a block diagram of a pair of pattern cells, which is capable of hiding the word VOID, in accordance with an example embodiment.

FIG. 4 illustrates a block diagram of a pair of pattern cells 18 and 19 capable of hiding the word VOID, in accordance with an example embodiment. Cell 18 shown at the left side of FIG. 4 represents the higher frequency pattern cell and can be defined by a rectangular cell width $C_w$ and a height $C_h$ with a rectangular mark width $M_w$ and a height $M_h$. The example shown in FIG. 4 can function on, for example, a Xerox 7845 MFD (Multi-Functional Device), but other values for $C_w$, $C_h$, $M_w$, and $M_h$ may be required for other devices. In the FIG. 4 example, the mark's area is 1/36 the pattern cell's area and is used as example the text box shown in FIG. 5. The cell 19 shown at the right side of FIG. 4 is a lower frequency or scaled pattern cell, which is the same as the left side besides the frequency. Cell 19 can be used for the text "X" shown in FIG. 5. Both cells 18 and 19 can be defined with vector graphics (e.g., vector graphics data) and are all that is needed to create variable data pantographs.

Figure 5:
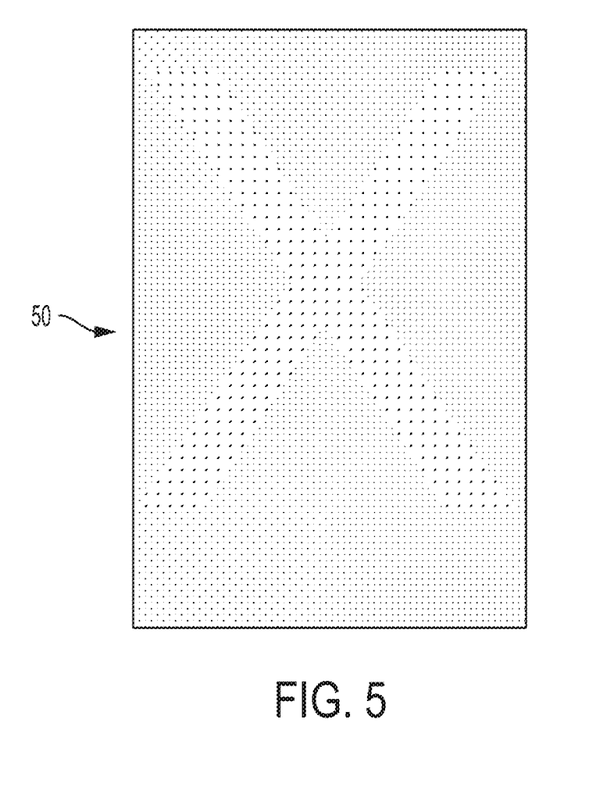
FIG. 5 illustrates a zoomed "X" in accordance with an example embodiment.

FIG. 5 illustrates text 50 of a zoomed "X" in accordance with an example embodiment. Note that the metameric pair of cells 18 and 19 shown in FIG. 4 hide the word VOID well.

Figure 6:
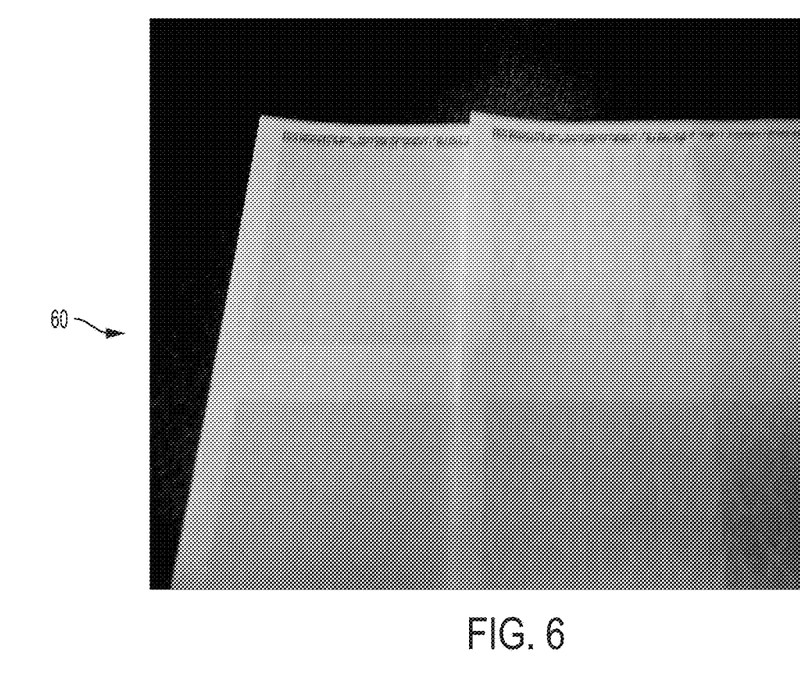
FIG. 6 illustrates a pictorial diagram depicting a working void pantograph, in accordance with an example embodiment.

FIG. 6 illustrates an image depicting a working void pantograph 60, in accordance with an example embodiment. To be working, the original document shown at the left hand side of FIG. 6 has to hide the variable data text of "VOID MAX $100" and the copy needs to show this text, which is the case with the document shown at the right hand side of FIG. 6.

Figure 7:
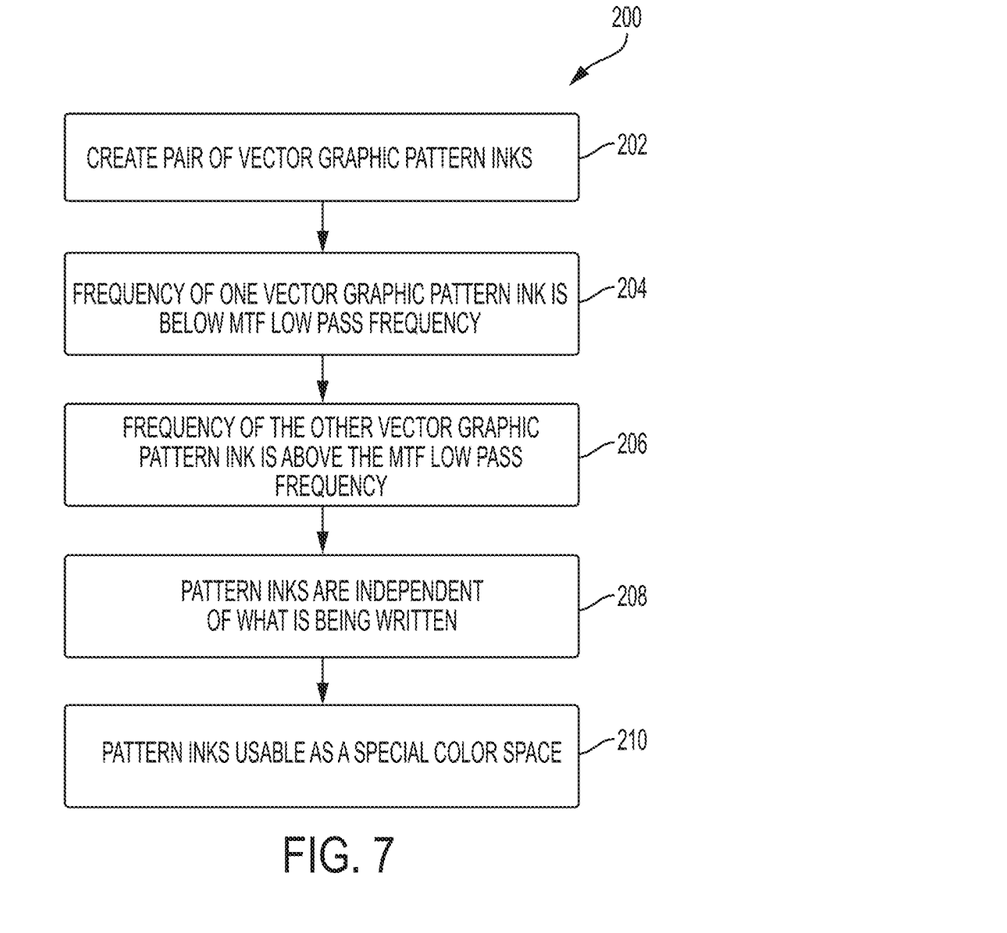
FIG. 7 illustrates a flow chart of operations depicting logical operational steps of a method for generating a variable data vector graphic pattern ink pantograph, in accordance with an example embodiment.

FIG. 7 illustrates a flow chart of operations depicting logical operational steps of a method 200 for generating a variable data vector graphic pattern ink pantograph, in accordance with an example embodiment. As indicated at block 202, a simple pair of vector graphic pattern inks can be created (which ultimately will contain almost identical gray levels to a human observer when rendered). As shown at block 204, the frequency of one ink is below a scanner's MTF (Modulation Transfer Function) low pass frequency and as illustrated at block 206, the frequency of the other ink is above the scanner's MTF low pass frequency. As indicated next at block 208, the pattern inks are configured such that they are independent of what is being written. Thus, for example, in a check printing system, each check can use variable data such as names, dates, and amounts in the pantograph. As shown at block 210, the two pattern inks can also be used as a special color space to paint any font or geometric object as easily as selection colors.

Note that the term MTF or Modulation Transfer Function as utilized herein can be used to describe the convolution of a PSF (Point Spread Functions) and the Gaussian (geometric) image of an object that is a continuous sinusoidal intensity pattern, in effect a continuum of dark and bright lines gradually changing from the maxima (in the middle of the bright line) to minima (middle of the dark line). The convolution integral sums up energy arising from the PSF blotches created at every point of the Gaussian image, and so describes the corresponding diffraction image of the pattern. Changes in the PSF due to aberrations, pupil obstructions, and other factors affect the quality of this diffraction image, specifically its contrast level and phase distribution. In general, convolution with the PSF smoothes out, i.e., flattens intensity distribution of the sinusoidal (or any other) pattern, lowering the contrast and acting as a low-pass filter (i.e., imposing limit to resolution)—the larger PSF vs. pattern's frequency, the more so.

Figure 8:
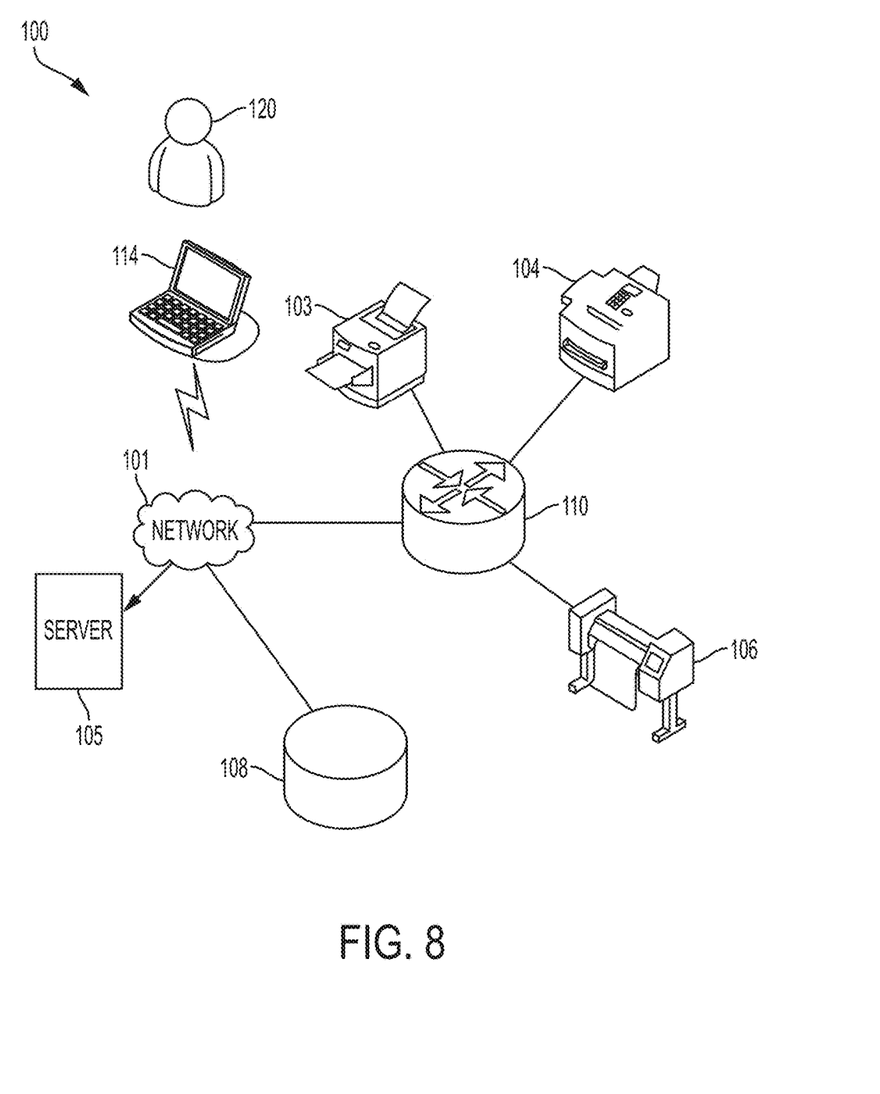
FIG. 8 illustrates a block diagram including various elements of equipment that may be included with and/or used by a document validation system, in accordance with an example embodiment.

FIG. 8 illustrates a block diagram including various elements of equipment that may be included with and/or used by a document validation system 100 for the validation of a certified document, in accordance with an example embodiment. The system 100 includes or is connected to one or more networks 101. As used in this document, the term "connected" refers to any configuration in which two or more devices may share data, programming instructions, or other electronic communications with each other via wired and/or wireless communications. A user 120 accesses the system by one or more computing devices 114, which may execute programming instructions to implement the processes described below, or which may contain and execute software (such as a browser or other portal software) that allows a user to access the system as executed by an external computing device.

Any number of image capture devices (e.g., scanner, a card scanner, flatbed image scanner, MFD, or similar device) 103, print devices 104 and 106, and a scanner are connected to network 101 either directly or indirectly (e.g., via a router or other connecting device). A networking device 110 such as a router may serve as a device to route information received via the network 101 to an appropriate print device. Networking device 110 may be any device capable of forwarding, routing, or otherwise transmitting packets and/or messages through a network, and any number of networking devices may be positioned within or on either side of network 101. A computer server 105 can also be implemented, which communicates with the network 105. In some cases, the network 105 can maintain the database 108 in a memory of the server 105 or the database 108 may be located or maintained elsewhere. It should be appreciated that print devices 103 or 104 in some embodiments may be MFDs with scanning capabilities or may be photocopy machines with scanning and printing capabilities and so on. In any event, print devices 103, 104 or devices such as scan can be used to scan documents having the disclosed pantograph(s).

The system 100 also can include one or more data storage facilities 108, such as a database that resides in a computer-readable memory and serves as a document repository that includes various data files corresponding to documents, document templates, and/or security templates (including security elements) that may be available for validation of a secured document. The data storage facilities 108 may include memory portions that are physically separate from the user's computing device 114 as shown, and/or they may include memory portions that are part of the user's computing device 114.

In certain embodiments, the data files may include copies of secure documents and/or document templates generated by an author from a computing device included in system 100, and sent to a recipient as an electronic document or a hard copy document. For example, a secured document may be mailed or e-mailed to a recipient with the expectation of receiving the secured document back at some point in the future, potentially with additional information added to the secured document. Examples may include bank checks, diploma certificates, tickets, permits, deeds, and other such documents sent to the respective issuing authority (primary recipient). In certain embodiments, the primary recipient may provide the system 100 with data regarding potential secondary recipients, which may include name, address, e-mail, and other contact and permission information. Such information may also be stored as data files in the data storage facilities 108.

The systems described in this document may include implementations that are embodied in a print device, an image capture device, a computing device with a connected print device, a software program, a cloud based system, or any combination of these items.

There are many situations in which a user may require a secured copy of a document. A secured copy is a printed document that contains one or more security elements that serve as an indicator that the document was generated by an authorized entity. The authorized entity may be a federal, state, or local government agency, or an entity to whom authorization is delegated, such as an automobile association or notary public. The system 100 can enable individuals who are not necessarily familiar with the location and/or identity of the security elements included in a document, in verifying the authenticity of the document.

Figure 9:
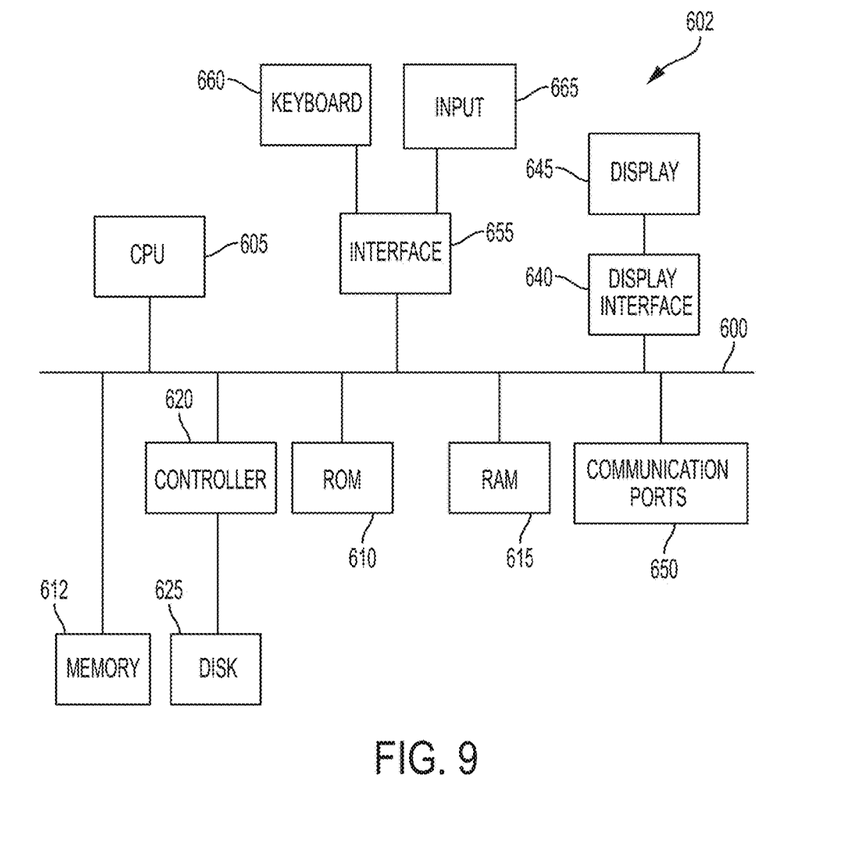
FIG. 9 illustrates a block diagram depicting various elements of an example of a computing device, which can be adapted for use in accordance with an example embodiment.

FIG. 9 depicts a block diagram of an example of a data-processing system 602 including internal hardware that may be used to contain or implement program instructions, such as the process steps discussed herein, according to example embodiments. Note that the data-processing system 602 can be implemented as, for example, the server 105 shown in FIG. 8, which communicates with the network 101 and/or maintains database 108 of FIG. 8 in a memory such as, for example, memory 612 shown in FIG. 9. The data-processing system 602 may also be, for example, a computing device such as the computing device 114 shown in FIG. 8.

A bus 600 serves as an information highway interconnecting the other illustrated components of the hardware. CPU 605 represents one or more processors of the system, performing calculations and logic operations required to execute a program. CPU 605, alone or in conjunction with one or more of the other elements disclosed in FIG. 9, is an example of a processing device, computing device, or processor as such terms are used within this disclosure. Read only memory (ROM) 610 and random access memory (RAM) 615 constitute examples of memory devices or processor-readable storage media.

A controller 620 interfaces with one or more optional tangible, computer-readable memory devices 612 to the system bus 600. These memory devices 612 may include, for example, an external or internal disk drive, a hard drive, flash memory, a USB drive, or the like. As indicated previously, these various drives and controllers are optional devices.

Program instructions, software, or interactive modules for providing the interface and performing any querying or analysis associated with one or more data sets may be stored in the ROM 610 and/or the RAM 615. Optionally, the program instructions may be stored on a tangible computer readable medium 625 such as a compact disk, a digital disk, flash memory, a memory card, a USB drive, an optical disc storage medium, and/or other recording medium controlled via a disk controller 620

An optional display interface 640 may permit information from the bus 600 to be displayed on the display 645 in audio, visual, graphic, or alphanumeric format. Communication with external devices, such as a printing device, may occur using various communication ports 650. A communication port 650 may be attached to a communications network, such as the Internet or an intranet.

The hardware may also include an interface 655 which allows for receipt of data from input devices such as a keyboard 660 or other input device 665 such as a mouse, a joystick, a touch screen, a remote control, a pointing device, a video input device, and/or an audio input device.

Based on the foregoing, it can be appreciated that a number of example embodiments are disclosed. In one example embodiment, a method of forming a patter ink pantograph can be implemented. Such an example method can include steps or operations such as, for example, configuring at least two pattern inks, wherein a frequency of one pattern ink among the at least two pattern inks comprises a frequency below an MTF (Modulation Transfer Function) and a frequency of another pattern ink among the at least two pattern inks comprises a frequency above the MTF; and wherein the at least two patter inks are usable as a special color space to paint a font or a geometric object, and wherein the at least two patter inks are independent of what is being written, thereby producing a variable data pantograph based on the at least two pattern inks.

In some example embodiments, each pattern ink among the at least two patter inks can constitute vector graphic data. In another example embodiment, a first cell can represent the one pattern ink having a higher frequency above the MTF, and a second cell can represent the other patter ink having a lower frequency below the MTF. In some example embodiments, the first cell can be defined by a rectangular cell width $C_w$ and a height $C_h$ with a rectangular mark width $M_w$ and a height $M_h$. In addition, the second cell can constitute a scaled pattern cell. Additionally, the first and second cells can be defined with vector graphics to create the variable data pantograph. In addition, in some example embodiments, the MTF low pass frequency is associated with a scanner.

In another example embodiment, a system for providing a pattern ink pantograph can be implemented. Such an example system can include, for example, at least one processor, and a non-transitory computer-usable medium embodying computer program code, the computer-usable medium capable of communicating with the at least one processor. The computer program code can include instructions executable by the at least one processor and can be configured for: providing at least two pattern inks, wherein a frequency of one pattern ink among the at least two pattern inks comprises a frequency below an MTF (Modulation Transfer Function) and a frequency of another pattern ink among the at least two pattern inks comprises a frequency above the MTF, and wherein the at least two pattern inks are usable as a special color space to paint a font or a geometric object, and wherein the at least two pattern inks are independent of what is being written, thereby producing a variable data pantograph based on the at least two pattern inks.

In still another example embodiment, a pattern ink pantograph can be implemented, which includes at least two pattern inks, wherein a frequency of one pattern ink among the at least two pattern inks comprises a frequency below an MTF (Modulation Transfer Function) and a frequency of another pattern ink among the at least two pattern inks comprises a frequency above the MTF, and wherein the at least two pattern inks are usable as a special color space to paint a font or a geometric object, and wherein the at least two pattern inks are independent of what is being written, thereby producing a variable data pantograph based on the at least two pattern inks.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method of forming a pattern ink pantograph, said method comprising:
   configuring at least two pattern inks, wherein a frequency of one pattern ink among said at least two pattern inks comprises a frequency below an MTF (Modulation Transfer Function) and a frequency of another pattern ink among said at least two pattern inks comprises a frequency above said MTF; and
   wherein said at least two pattern inks are usable as a special color space to paint a font or a geometric object, and wherein said at least two pattern inks are independent of what is being written, thereby producing a variable data pantograph based on said at least two pattern inks.

2. The method of claim 1 wherein each pattern ink among said at least two pattern inks comprise vector graphic data.

3. The method of claim 1 wherein a first cell represents said one pattern ink having a higher frequency above said MTF, and wherein a second cell represents said another pattern ink having a lower frequency below said MTF.

4. The method of claim 3 wherein said first cell is defined by a rectangular cell width $C_w$ and a height $C_h$ with a rectangular mark width $M_w$ and a height $M_h$.

5. The method of claim 3 wherein said second cell comprises a scaled pattern cell.

6. The method of claim 3 wherein said first and second cells are defined with vector graphics to create said variable data pantograph.

7. The method of claim 1 wherein said MTF low pass frequency is associated with a scanner.

8. A system for providing a pattern ink pantograph, said system comprising:
   at least one processor; and
   a non-transitory computer-usable medium embodying computer program code, said computer-usable medium capable of communicating with said at least one processor, said computer program code comprising instructions executable by said at least one processor and configured for:
      configuring at least two pattern inks, wherein a frequency of one pattern ink among said at least two pattern inks comprises a frequency below an MTF (Modulation Transfer Function) and a frequency of another pattern ink among said at least two pattern inks comprises a frequency above said MTF; and
      wherein said at least two pattern inks are usable as a special color space to paint a font or a geometric object, and wherein said at least two pattern inks are independent of what is being written, thereby producing a variable data pantograph based on said at least two pattern inks.

9. The system of claim 8 wherein each pattern ink among said at least two pattern inks comprise vector graphic data and wherein a first cell represents said one pattern ink having a higher frequency above said MTF, and wherein a second cell represents said another pattern ink having a lower frequency below said MTF.

10. The method of claim 9 wherein said first cell is defined by a rectangular cell width $C_w$ and a height $C_h$ with a rectangular mark width $M_w$ and a height $M_h$.

11. The system of claim 9 wherein said second cell comprises a scaled pattern cell.

12. The system of claim 9 wherein said first and second cells are defined with vector graphics to create said variable data pantograph.

13. The system of claim 8 wherein said MTF low pass frequency is associated with a scanner.

14. A pattern ink pantograph, said comprising:
   at least two pattern inks, wherein a frequency of one pattern ink among said at least two pattern inks comprises a frequency below an MTF (Modulation Transfer Function) and a frequency of another pattern ink among said at least two pattern inks comprises a frequency above said MTF; and
   wherein said at least two pattern inks are usable as a special color space to paint a font or a geometric object, and wherein said at least two pattern inks are independent of what is being written, thereby producing a variable data pantograph based on said at least two pattern inks.

15. The pattern ink pantograph of claim 14 wherein each pattern ink among said at least two pattern inks comprise vector graphic data.

16. The pattern ink pantograph of claim 14 wherein a first cell represents said one pattern ink having a higher frequency above said MTF, and wherein a second cell represents said another pattern ink having a lower frequency below said MTF.

17. The pattern ink pantograph of claim 16 wherein said first cell is defined by a rectangular cell width $C_w$ and a height $C_h$ with a rectangular mark width $M_w$ and a height $M_h$.

18. The pattern ink pantograph of claim 16 wherein said second cell comprises a scaled pattern cell.

19. The pattern ink pantograph of claim 16 wherein said first and second cells are defined with vector graphics to create said variable data pantograph.

20. The pattern ink pantograph of claim 14 wherein said MTF low pass frequency is associated with a scanner.

\* \* \* \* \*